United States Patent
Lange

[11] 3,757,627
[45] Sept. 11, 1973

[54] METHOD AND APPARATUS FOR CUTTING PINS FOR PRODUCING CHAIN LINKS

[75] Inventor: Gerhard Lange, Reutlingen, Germany

[73] Assignee: Wafios Maschinen fabrik Wagner, Ficker & Schmid G.m.b.H., Reutlingen, Germany

[22] Filed: May 28, 1971

[21] Appl. No.: 147,986

[30] Foreign Application Priority Data
June 18, 1970 Germany.................. P 20 29 865.1

[52] U.S. Cl.......................... 83/558, 83/51, 83/600, 225/103
[51] Int. Cl.......................... B23d 17/00, B26d 3/16
[58] Field of Search.................... 83/51, 558, 560, 83/600, 623; 10/25; 225/103, 104, 105

[56] References Cited
UNITED STATES PATENTS

| | | | |
|---|---|---|---|
| 2,057,928 | 10/1936 | Stahl | 83/51 |
| 2,613,719 | 10/1952 | Conrad | 83/560 X |
| 845,331 | 2/1907 | Briede | 83/623 X |
| 1,559,082 | 10/1925 | Friederici | 83/600 X |

*Primary Examiner*—Donald R. Schran
*Assistant Examiner*—James F. Coan
*Attorney*—Arthur O. Klein

[57] ABSTRACT

The production of pins which subsequently are to be bent and welded to form chain links, in which each pin is cut off a rod by a pair of equal wedge-shaped blades which are simultaneously reciprocated in opposite directions to each other within a common central plane extending transverse to the axis of the rod, and which while cutting impress V-shaped notches into diametrically opposite sides of the rod so that the ends of each pin have an angular shape similar to a peaked roof. One preferred embodiment of the invention provides that, instead of forcing the two blades so deeply in the material that their cutting edges engage with each other and thus cut off each pin completely, the blades are impressed only for such a distance into the material that a thin connecting web remains between the pin and the rod supply which web is then shorn off by moving the pin transversely relative to the rod.

5 Claims, 4 Drawing Figures

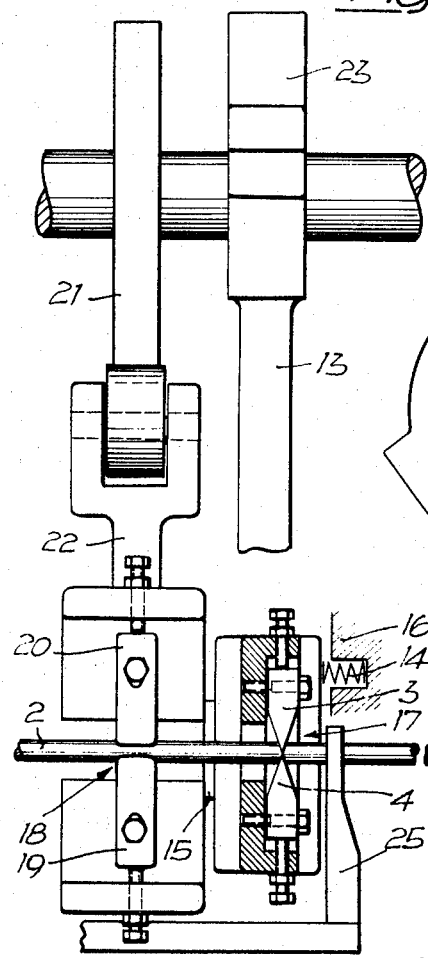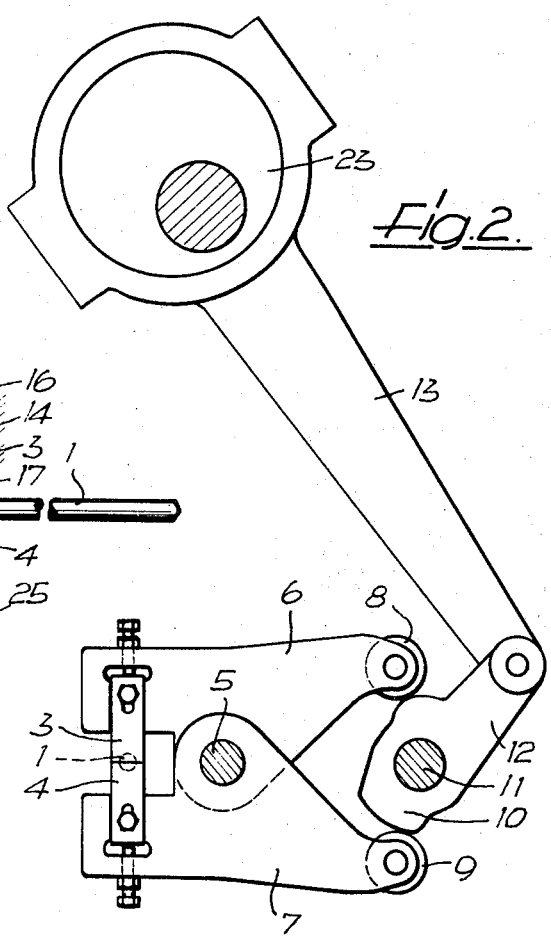

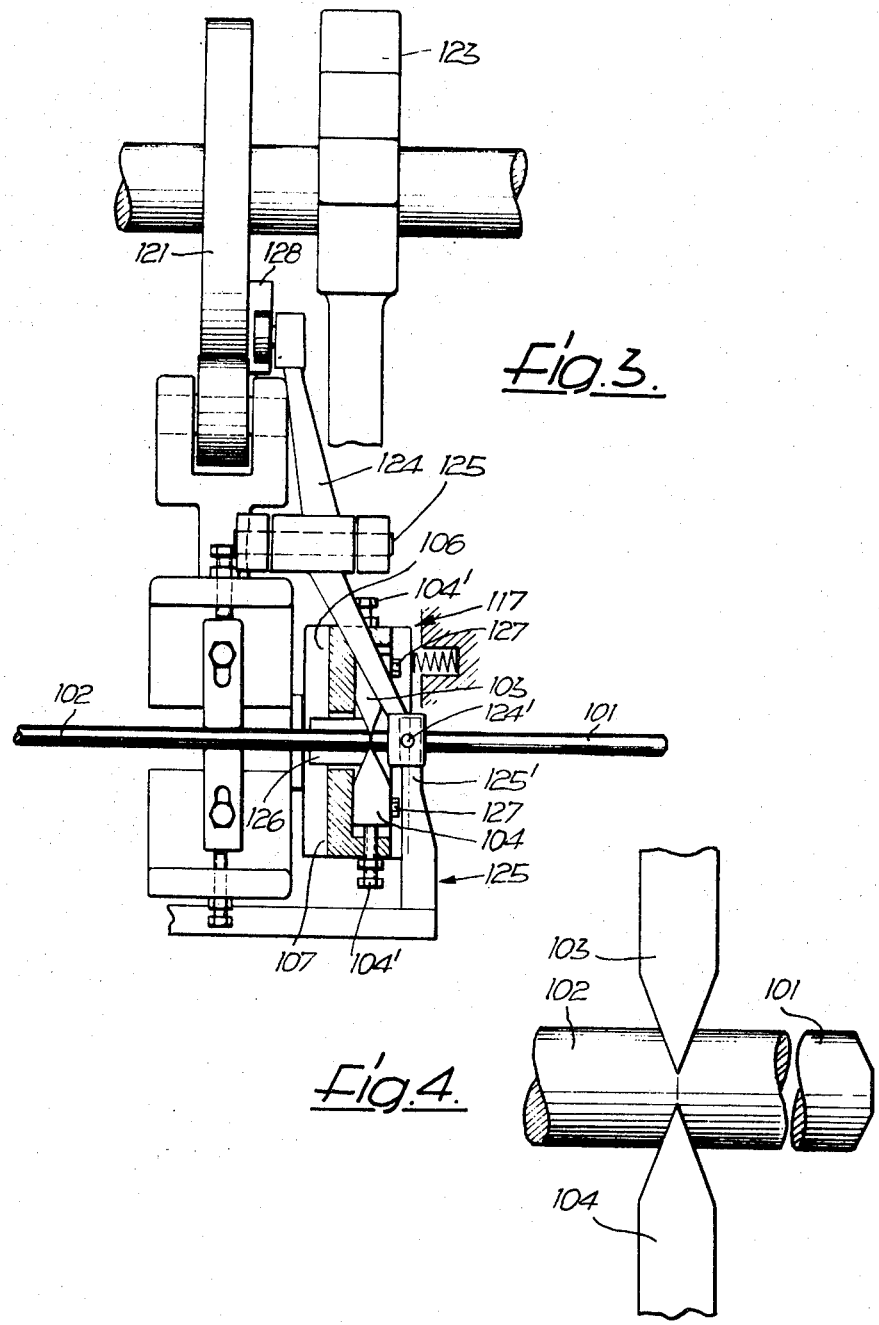

METHOD AND APPARATUS FOR CUTTING PINS FOR PRODUCING CHAIN LINKS

The present invention relates to a method and an apparatus for periodically cutting pins with ends of an angular shape similar to a peaked roof off a rod or wire of a greater length for subsequently producing chain links therefrom.

The conventional manner of producing the pins which are subsequently to be bent to form chain links consists in cutting these pins by means of shears off a longer rod or wire. The ends of each pin then have substantially plane surfaces which are undesirable for butt-welding them together after the pin has been bent. It has therefore already been proposed to saw or mill notches of a triangular shape into two opposite points of the rod so that the ends of each pin will then have an angular shape similar to a peaked roof. Although pin ends of such a shape are very suitable for butt-welding them together after the respective pin has been bent into a link shape, this manner of producing such pin ends is much too expensive at least in all cases in which the links are made of a rod stock of a moderate thickness.

It is an object of the present invention to provide a very inexpensive method and a simple apparatus for cutting sections off a rod or wire so as to form pins each of which is provided by this cutting operation with a pair of opposite ends of an angular shape similar to a peaked roof, which has been found to be the most suitable shape for welding the two ends together after the pin has been bent into a link shape.

According to the invention, this object is attained by cutting the pins off a rod or wire by a cutting operation which does not involve the removal of any material and in which the ends of adjacent pins are cut by forming angular notches at diametrically opposite points of the rod.

The formation of such notches according to the invention during the operation of cutting off the pins is not more expensive than the usual cutting operation by means of shears either insofar as the cost of the necessary machine or the length of time for the cutting operation is concerned. When such roof-shaped ends are welded together, the weld produced has a similar quality and requires a similar length of time as the weld between two spherically rounded ends which can only be produced at considerable expense, because in each case the adjacent ends are welded by being heated from the inside toward the outside.

According to one feature of a preferred embodiment of the invention, each notch is impressed into the rod to a depth which is smaller than one half of the diameter of the rod so that a small web will remain between the two notches which may then be broken off by moving the two ends of the rod which are connected by the web relative to each other in a direction transverse to the longitudinal direction of the rod. The broken surface which is thus produced is substantially plane and this surface together with the flanks of the notches causes the roof-shaped ends of each pin to be of a trapezoidal shape. Such a shape has the considerable advantage that no burrs or ridges will be formed on the points of separation which might break off during the subsequent work and might lead to interferences in the operation of the machines carrying out this work, or which might burn off during the welding operation and might cause the welded part of each link to have an uneven structure which would impair the solidity of the weld and thus of the entire link. It is another advantage of this manner of cutting off the individual pins that, when the pin is bent into a link shape and its ends are pressed against each other during the welding operation, these ends cannot slide past each oher and will thus not be bent out of axial alignment with each other, as it may occur if the ends are of a bladelike shape and their sharp edges do not accurately meet each other.

The apparatus according to the invention for carrying out the new method comprises a pair of opposite notching blades which are movable back and forth in opposite directions within a common plane which extends transversely to the axis of the rod to be cut and at right angles to the directions of the cutting edges of these blades which are likewise disposed within the same plane so as to face each other.

By means of such notching blades it is easily possible while severing each pin from a rod to impress triangular notches into the adjacent ends of the rod and pin so that each free end will then have an angular, substantially roof-shaped form.

Another feature of the invention consists in providing suitable means for clamping the rod in a fixed position at a point which is spaced at a certain distance from its free end from which immediately thereafter a pin of a predetermined length is cut by the blades, and in mounting the blades so as to permit them — because of the wedging action exerted by them upon the pin during their cutting movement — to move as a unit together with the pin for a short distance in the axial forward direction of the latter. Due to this manner of mounting the blade unit, the material of the end of the rod and of the adjacent end of the pin will be only slightly compressed despite the wedging action which, due to their shape, the blades exert during the cutting operation upon this material and the blades will therefore not be subjected to any stresses in their transverse directions and only very low power will be required for driving the blades toward each other and into the rod material so as to cut off each pin.

Another feature of the invention consists in the provision of simple means for returning the blade unit after the cutting operation to its original postiion. These means may consist, for example, of a spring which then shifts this unit back to this position in which it engages with a fixed stop.

According to a preferred embodiment of the invention which is of advantage because of its simplicity of construction, the two notching blades are mounted on a pair of arms which are pivotable relative to each other and are together slidable along their pivot axis and adapted during the cutting operation to move like the arms of a pair of shears.

If the opposite notches are impressed into the rod to a depth so that a central web remains between them this web may be broken off while the two rod sections are still mounted in the cutting apparatus. It is for this purpose only necessary to provide a pressure element which is adapted to exert a pressure upon one of the two rod sections at a point directly adjacent to the notching blades and in a direction transverse to the longitudinal direction of the latter and in the longitudinal direction of the cutting edges of the blades, and to provide a solid support for the other rod section which likewise supports the latter directly adjacent to the notching blades at the side of the rod opposite to that upon which the pressure is exerted.

The features and advantages of the present invention will become more clearly apparent from the following detailed description thereof which is to be read with reference to the accompanying drawings, in which:

FIG. 1 shows diagrammatically and partly in cross section a side view of the essential elements of the apparatus according to a first embodiment of the invention;

FIG. 2 shows an end view of the notch-cutting mechanism without its housing, and of its driving means;

FIG. 3 shows a view similar to FIG. 1 of an apparatus according to a second embodiment of the invention; while FIG. 4 shows an enlarged view of the notching blades of the apparatus according to FIG. 3 in their position of the deepest penetration into the rod.

Referring first particularly to FIGS. 1 and 2 of the drawings, the apparatus according to the invention for producing pins 1 of an equal but adjustable length, each of which is subsequently to be bent into the shape of a chain link and the abutting ends of which are then to be welded together, comprises a pair of notching blades 3 and 4 which are movable back and forth in opposite directions to each other within a common plane which extends transversely to the axis of the rod 2 from which the pins 1 are to be cut. These two blades 3 and 4 are equally wedge-shaped and terminate in cutting edges facing each other. The blade angle of each of these blades 3 and 4 is made as acute as possible, although large enough so that the blades will be sufficiently resistant to wear and breakage.

As illustrated more in detail in FIG. 2, each of the two equal notching blades 3 and 4 is mounted on one arm of a two-armed lever 6 or 7, respectively, and in a manner so as to be easily removed and exchanged, and both of these levers are pivotable relative to each other about the axis of a common shaft 5. The ends of the two other arms of levers 6 and 7 which are drawn toward each other, for example, by a tension spring, not shown, carry rollers 8 and 9 which are rotatable about parallel axes and engage at all times upon the cam surfaces of a cam plate 10 which is pivotable about the axis of a fixed shaft or pivot pin 11. This cam plate 10 has a radially projecting arm 12 which is pivotably connected to one end of a connecting rod 13 which is driven by an eccentric 23 which is mounted on a drive shaft 24. Thus, at each revolution of drive shaft 24, cam plate 10 will be pivoted back and forth about the axis of shaft 11 and will thereby pivot the levers 6 and 7 equally in opposite directions to each other so that both notching blades 3 and 4 will be moved at the same speed and alternately toward or away from each other. If desirable, it is also possible by a suitable design of the crank and cam drive of levers 6 and 7 to carry out the cutting strokes of blades 3 and 4 at a speed different from that of their retracting strokes.

Levers 6 and 7 are slidable axially along the shaft 5, but only together as a unit and for equal distances so that the cutting edges of blades 3 and 4 will always remain within a common plane and point directly toward each other. Suitable means which are indicated diagrammatically in FIG. 1 in the form of a compression spring 14 tend to maintain the levers 6 and 7 in engagement with a stationary stop member 15 which is mounted at the side of the levers preceding the cutting position of blades 3 and 4, as seen in the direction in which rod 2 is fed periodically for equal distances by a feeding mechanism, not shown. Spring 14 acts upon the other side of one or both levers 6 and 7 and is mounted on a stationary part 16 of the cutting mechanism which is indicated generally by the numeral 17.

At the other side of the stop member 15 a clamping mechanism 18 is mounted which is adapted to clamp the rod or wire 2 in a fixed position during each cutting operation of blades 3 and 4. This clamping mechanism consists of a stationary clamping jaw 19 and a second clamping jaw 20 which is adapted to be reciprocated relative to the jaw 19 by means of a cam plate 21 which is also mounted on drive shaft 24 and rolls along a roller 26 which is rotatable on one end of an arm 22 and held in constant engagement with cam plate 21 by a spring, not shown, which acts upon the arm 22, while the other end of this arm is connected to the clamping jaw 20. Since the reciprocating movements of clamping jaw 20 and those of blades 3 and 4 are derived from the same drive shaft 24, they may be easily timed in relation to each other so that the rod or wire 2 will be clamped between jaws 19 and 20 just before blades 3 and 4 while moving toward each other engage upon rod 2 which will then remain clamped until the blades after cutting off the pin 1 are being retracted and have completely disengaged from the adjacent ends of rod 2 and pin 1. As soon as rod 2 is then released by the retraction of clamping jaw 20, the feed mechanism as previously mentioned will shift the rod forwardly for the distance required for cutting off the next pin 1, and, unless the last-formed pin 1 is not withdrawn, from the cutting mechanism 17 in the manner as subsequently described for being conveyed, for example, to a station in which it is bent into a link shape, the angular roof-shaped end of rod 2 will abut against the equally shaped end of this pin 1 and will eject the latter from the cutting mechanism.

Instead of being thus ejected from the cutting mechanism 17 by the next feeding movement of rod 2, pin 1 may be gripped by tongs 25 immediately before it is completely severed from rod 2. As soon as this occurs, these tongs 25 which are only illustrated diagrammatically in FIG. 1 will carry the pin 1 to a mechanism, not shown, in which the pin is bent into the shape of a chain link and in which, if desired, the two angular ends of pin 1 which then abut against each other may also be welded together.

After the two levers 6 and 7 have been pivoted relative to each other so as to disengage the blades 3 and 4 completely from the front end of rod 2, spring 14 moves levers 6 and 7 again into engagement with stop member 15.

The same cycle of operations is then repeated, the clamping jaws 19 and 20 will again clamp the rod or wire 2 in a fixed position, and blades 3 and 4 will again be equally moved toward each other and will thereby impress two opposite notches into the wire until their cutting edges engage with each other and the next pin 1 is thus cut off. Due to the notching action of blades 3 and 4 upon rod 2 during this cutting operation, the adjacent ends of rod 2 and pin 2 will again be inclined from both sides similar to peaked roofs, and due to the wedging action of the blades upon the rear end of pin 1 this pin together with blades 3 and 4 and levers 6 and 7 carrying the latter will be shifted forwardly against the action of spring 14 and thus away from stop member 15 and the clamping mechanism 18.

The apparatus according to the second embodiment of the invention as illustrated in FIGS. 3 and 4 is adapted to produce the adjacent ends of the rod or wire sections 101 and 102 to be of a trapezoidal shape. The cutting mechanism 117 is for this purpose designed so that, when the two notching blades 103 and 104 are equally impressed to their deepest points of penetration into the material, their cutting edges will still be spaced at a small distance from each other. This distance which may amount, for example, to one quarter of the diameter of the rod or wire 102 from which the pins 101 are to be severed is adjustable by means of screws 103' and 104'. Blades 103 and 104 may be locked in the adjusted positions on the levers 106 and 107 by means of screws 127 which which extend transversely through the two blades and into the levers.

Since the blades 103 and 104 do not penetrate as deeply into the rod or wire as the blades 3 and 4 according to FIGS. 1 and 2, the blade angle of each blade 103 and 104 may be slightly larger than that of each blade 3 and 4 even though the maximum width of the notches which both kinds of blades impress into the rod material may be equal. Such blades 103 and 104 with a wider blade angle have the advantage of being more resistant to wear and breakage.

Since the cutting edges of the blades 103 and 104 at the point of their deepest penetration into the rod material are still spaced at a certain distance from each other, the rod section 101 will still be connected to the main rod section 102 by a central web. For severing this web, the apparatus according to FIG. 3 is provided with a two-armed pressure lever 124 which is pivotable about an axis 125 which is located between the drive shaft carrying the cam plate 121 and the eccentric 123 and the rod or wire 102 and extends parallel to the axes of this shaft and rod 102. By means of a pin 124', the outer end of lever 124 is adapted to press upon the jaw 125' of the tongs 125 in a direction transverse to the longitudinal direction of rod section 101 which is to be severed from rod 102 and substantially in the longitudinal direction of the cutting edges of the two blades 103 and 104. Since tongs 125 grip the rod section 101 closely adjacent to blades 103 and 104, the force which will be exerted by lever 124 upon this rod section consists substantially only of a shearing force.

At the other side of and immediately adjacent to blades 103 and 104, the end of rod 102 from which the section 101 is to be severed which is subsequently to be bent into the shape of a chain link is rigidly supported by a member 126 which serves as an anvil. This end of rod 102 is thus rigidly held when the connecting web between the two rod sections 101 and 102 is broken off and rod 102 is therefore prevented from bending.

The pivoting movement of lever 124 for exerting a pressure upon jaw 125' of tongs 125 is produced by a cam 128 which is mounted on cam plate 121 and acts upon the associated arm of lever 124. After lever 124 has carried out its pivoting pressure movement under the action of cam 128, the lever is returned to its original position by the action of a spring, not shown.

Of course, the pressure lever 124 may also be driven by any other suitable means, for example, by a separate cam plate.

In all other respects, the apparatus according to FIG. 3 may be of the same construction as the apparatus according to FIGS. 1 and 2.

Although my invention has been illustrated and described with reference to the preferred embodiment thereof, I wish to have it understood that it is in no way limited to the details of such embodiment but is capable of numerous modifications within the scope of the appended claims.

Having thus fully disclosed my invention, what I claim is:

1. An apparatus for producing pins with wedge-shaped ends for subsequently producing chain links therefrom, comprising a pair of notching blades each having a substantially V-shaped cross-section with an apex facing that of the other blade, and means for slidably mounting said blades and for reciprocating them in opposite directions to each other within a common plane extending transverse to the axis of a rod from which a pin is to be cut by said blades so that each blade is impressed into said rod substantially up to the longitudinal axis of said rod and a section is cut off said rod to form one of said pins when both blades reach said axis of said rod the adjacent ends of said rod and said pin then having said angular shape, means for clamping said rod in a fixed position at a point at the rear of said blades, stationary stop means between said clamping means and said blades for determining the normal position of said blades prior to impressing said blades into said rod, mounting said blades so as to be slidable together as a unit for a limited distance from said stop means in the axial direction of said rod so that, while said blades are being impressed into said rod, the unclamped section of said rod in front of said blades will yield together with said blade unit in said axial direction away from said stop means because of the V-shape of said blades, and means for returning said blade unit to said normal position after said section of said rod forming a pin has been cut off by said blades.

2. An apparatus as defined in claim 1, in which said returning means comprise at least one spring acting upon said blade unit, said spring unit being yieldable in said axial direction against the action of said spring.

3. An apparatus for producing pins with wedge-shaped ends for subsequently producing chain links therefrom, comprising a pair of notching blades each having a substantially V-shaped cross-section with an apex facing that of the other blade, and means for slidably mounting said blades and for reciprocating them in opposite directions to each other within a common plane extending transverse to the axis of a rod from which a pin is to be cut by said blades so that each blade is impressed into said rod substantially up to the longitudinal axis of said rod and a section is cut off said rod to form one of said pins when both blades reach said axis of said rod the adjacent ends of said rod and said pin then having said angular shape, said means for slidably mounting and reciprocating said blades comprising a shaft mounted in a fixed position, and comprising a pair of two-armed levers mounted on said shaft so as to be pivotable in opposite diections to each other about said shaft and also to be slidable together as a unit along said shaft in its axial direction, means for removably securing said blades to the arms of said levers at one side of said shaft, and means for moving both other arms of said levers equally toward and away from each other and for thereby moving said blades accordingly.

4. An apparatus as defined in claim 3, in which said first member forms a stationary supporting member.

5. An apparatus as defined in claim 4, in which said second member forms a lever which is pivotable in response to the movements of said blades.

* * * * *